US005888592A

United States Patent [19]

Biallas et al.

[11] Patent Number: 5,888,592

[45] Date of Patent: Mar. 30, 1999

[54] LABORATORY DRIER AND METHOD

[75] Inventors: Bernd Biallas, Albersloh; Klaus Holzapfel, Ascheberg; Stefan Sickert, Hamm; Peter Machaczek, Münster, all of Germany

[73] Assignee: BASF Coatings AG, Muenster-Hiltrup, Germany

[21] Appl. No.: 896,247

[22] Filed: Jul. 17, 1997

[51] Int. Cl.[6] .................................................. B29C 71/02

[52] U.S. Cl. ......................... 427/542; 118/642; 118/643; 427/372.2

[58] Field of Search ................................ 427/542, 372.2; 118/642, 643

[56] References Cited

FOREIGN PATENT DOCUMENTS 2 047 396 11/1980 United Kingdom .

*Primary Examiner*—Bernard Pianalto

[57] ABSTRACT

Laboratory drier for the simulation of industrial lacquer drying installations, containing an irradiation space with IR emitters and a convection space adjacent to this and having ventilated and heated drying gases.

18 Claims, 1 Drawing Sheet

FIG 1
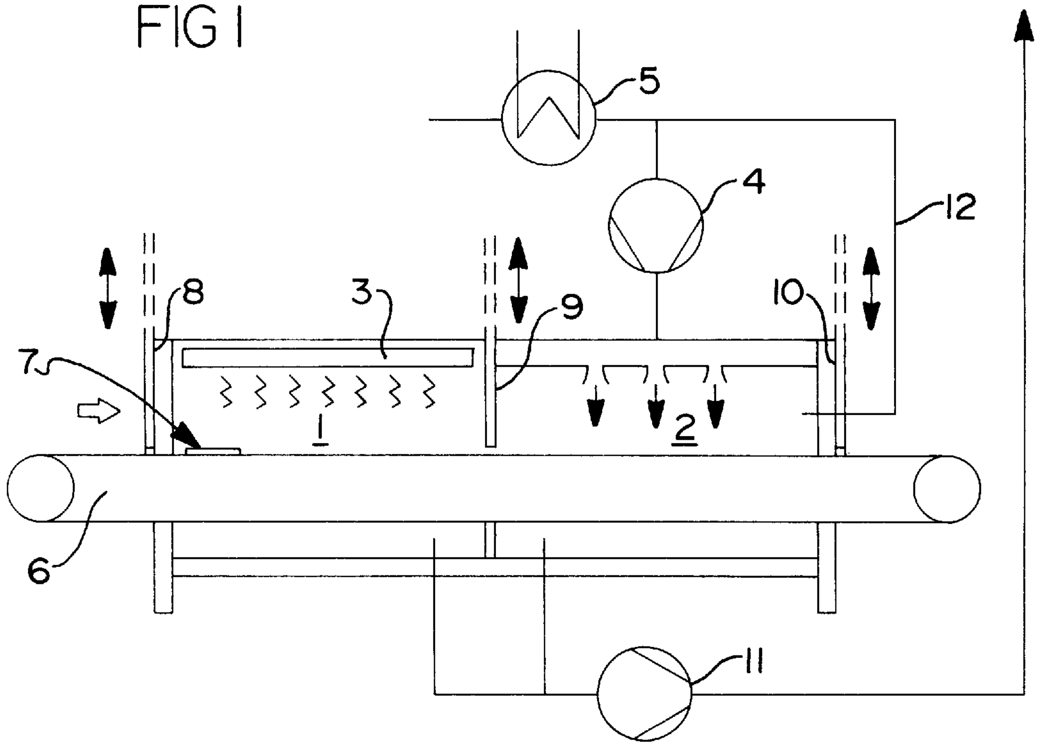
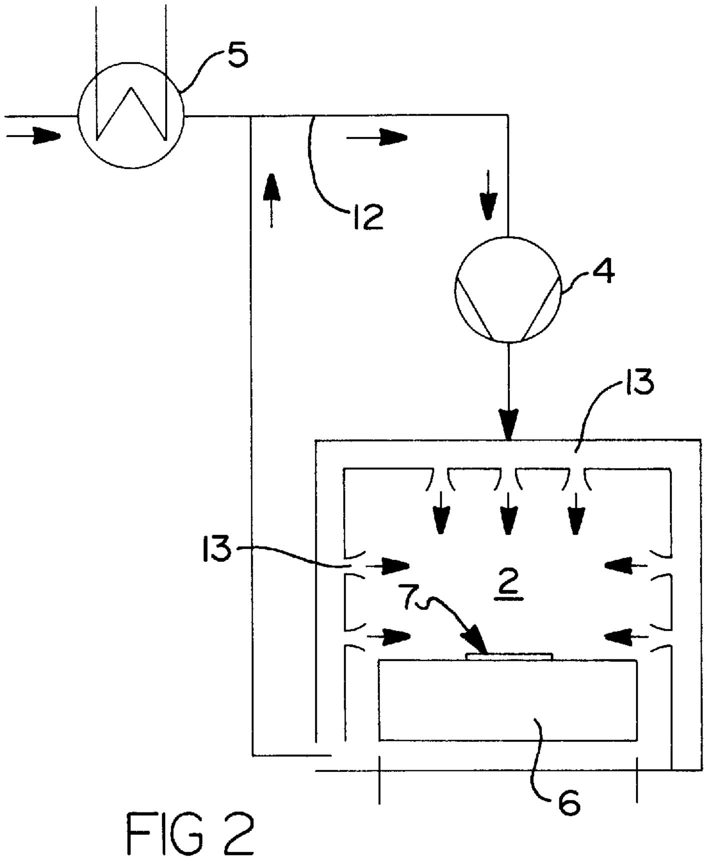
FIG 2

LABORATORY DRIER AND METHOD

The present invention relates to an appliance, known as a laboratory drier, for the simulation of industrial lacquer drying installation.

An important stage in the research and development of lacquers is the investigation of their drying behavior. By drying is meant, in this case, the curing of the applied (liquid or pulverulent) lacquer layer. In this case, drying consists, as a rule, of two operations: on the one hand, solvents which may possibly be present are evaporated, for example the water from water-based lacquers ("flash-off"). On the other hand, drying brings about the chemical cross-linking of the binders of the lacquer. The method of conducting the process during lacquer drying has decisive effects on the properties of the lacquer layer obtained. It is therefore absolutely necessary, in the course of industrial research, to investigate the drying operation in the laboratory and, at the same time, simulate as exactly as possible the conditions which occur in large-scale industrial installations.

However, the laboratory driers, known from the prior art, for the investigation of lacquer samples in the laboratory are only extremely unsatisfactory in making it possible to simulate actual industrial processes. Thus, there are so-called continuous-flow installations, in which articles to be dried are moved continuously through an oven and, at the same time, are ventilated with heated drying gases. However, on the one hand, installations of this type need a considerable overall length, so that the coatings can be dried sufficiently over the distance covered. On the other hand, pure convection drying is involved here. An exact control of the temperature of the article to be dried is not possible with these installations.

Furthermore, there are drying chambers with built-in infrared (IR) emitters. The samples to be dried have to be introduced into a chamber drier of this type and remain there until after the end of the drying operation. On account of the thermal properties of the chamber as an entire appliance, its temperature behavior can be controlled to only an extremely limited extent. Moreover, after a drying test a chamber of this type has to be cooled again to the initial state, before a new sample can be introduced and dried. Furthermore, these appliances lack precisely a convection part, by means of which the convection component of an actual industrial drying operation can be simulated.

In contrast to this, the set object of the present invention is to avoid the disadvantages of the prior art and to provide a laboratory drier, by means of which large-scale drying operations can be simulated realistically and which, for this purpose, makes it possible, in particular, to pass through various temperature profiles and allows the drying to be simulated by means of convection processes. Furthermore, the laboratory drier according to the invention, by virtue of a compact design, is to have laboratory-size dimensions and permit high efficiency.

This object is achieved by means of a laboratory drier according to the invention which contains the following elements:

a) an irradiation space with IR emitters, b) a convection space with means for the generation, guidance and movement of drying gases, c) a conveying system for holding and transporting coating samples through the irradiation space and the convection space, d) door systems at the entrance and exit of the laboratory drier as well as between the irradiation space and the convection space.

Surprisingly, all the above mentioned requirements can be satisfied by the laboratory drier according to the invention. In the first place, by arranging an irradiation space with IR emitters, it is possible to impart virtually any temperature profile to a coating sample. For this purpose, the irradiation space has located in it preferably measuring sensors which record the temperature and, if appropriate, further important parameters and transmit these to a regulating system which (inter alia) controls the heating capacity of the IR emitters. Virtually any temperature profile can thereby be generated in the coating sample by the presetting of desired curves. In particular, it is possible to simulate the temperature profiles which, from experience, occur during industrial drying operations in large installations, for example in automobile lacquering.

Furthermore, the laboratory drier according to the invention contains a convection space which is directly adjacent to the irradiation space. Means for generating the convection which brings about the drying are located within the convection space. These are preferably inlet and outlet ports for the drying gas and at least one ventilation pump. Those components of an actual drying operation which are brought about by convection can be simulated in the convection space. For this purpose, the convection space preferably contains measuring sensors for important parameters, such as, for example, temperature, pressure or gas velocity, which feed their measured values back to a regulating system. The regulating system can then act in a predetermined way on the temperature or the volumetric flow of the drying gases.

The use of the irradiation and convection space as described within the appliance according to the invention is made possible by a conveying system which holds the coating samples and which transports them from the irradiation space into the convection space. As a rule, transport will take place in the order specified. However, the installation according to the invention also fundamentally makes it possible to guide the sample through the laboratory drier in reverse order or to move it to and fro, as desired, between the irradiation and the convection space. Furthermore, the appliance according to the invention contains door systems at the entrance and exit of the laboratory drier as well as between the irradiation space and the convection space. These door systems, which open only for the purpose of introducing the coating samples, ensure that the two drying spaces are closed off. Disturbing influences from outside or an emission of exhalation products into the environment are thereby ruled out.

The laboratory drier according to the invention has, in the first place, the advantage that it combines two different drying methods, namely IR irradiation and convection, in one appliance. It is thereby possible to simulate both components of an actual drying operation. Accommodation in a single appliance avoids non-reproducible disturbing influences occurring as a consequence of the transport of a coating sample from a laboratory drier of one type into a laboratory drier of another type. Furthermore, the laboratory drier, with its closed-off chambers and the controllable conveying system, is designed to allow the coating samples to rest for predeterminable periods within the respective drying chambers. Consequently, in contrast to a continuous-flow oven, the laboratory drier can be made compact, since the drying elements have to be only as large as the coating samples (and not as large as the distance covered by them). Moreover, an extremely exact simulation of actual drying conditions can be carried out as a result of the feedback regulation of the temperature and convection profiles. Furthermore, by accommodating IR drying and convection in different spaces, it is possible to operate both spaces continuously. There is therefore no need, for example, to return the irradiation space to the initial state after each drying operation.

The conveying system for the coating samples is preferably a traveling belt. The conveying system can be connected to a control or regulating system which monitors the transport operation and which, in particular, gives attention to specific dwell times in the individual spaces.

Both the irradiation space and the convection space can be connected to a venting system. Preferably evaporated solvents are discharged by means of this venting system.

The drying gases used within the convection space are preferably conveyed in circulation. The drying gases can, in particular, be air.

Finally, it is preferred, according to the invention, to arrange the IR emitters and/or the inlets and outlets for the drying gases variably, in such a way that the IR radiation direction or the direction of flow of the gases can be varied so that coating samples rotated through 90° can also be dried. Since the coating samples are, as a rule, plate-shaped bodies, this design of the laboratory drier makes it possible to dry coated plates both lying horizontally and standing vertically.

The invention also relates to a method for simulating the drying operations in industrial lacquer drying installations, in which method coating samples are first produced, and these are then transported into an irradiation space and, if appropriate, dwell there for a specific period. Infrared radiation acts on the coating samples within the irradiation space. This is preferably carried out by generating a regulated temperature profile. Furthermore, in the method according to the invention, the samples are transported into a convection space adjacent to the irradiation space and, if appropriate, can dwell there for a specific period. Within the convection space, drying gases, preferably air, circulate round the coating samples. It is particularly preferable, in this case, if the temperature and volumetric flow of the drying gases within the convection space are monitored in a feedback regulating circuit.

BRIEF DESCRIPTION OF THE DRAWINGS

The appliance according to the invention is explained below by way of example by means of the Figures.

FIG. 1 shows a diagram of the entire laboratory drier in a side view.

FIG. 2 shows a cross section through the convection space.

The laboratory drier according to FIG. 1 is essentially formed from the two adjacent chambers of the irradiation space 1 and of the convection space 2. The IR emitters 3 are arranged on the ceiling of the irradiation space 1. These emit their infrared radiation downward and thereby reach a wide area of the coating sample 7 transported on the conveyor belt 6. However, according to the invention, there is also provision for making the infrared emitters pivotable in such a way that they can also dry a coating sample 7 standing vertically (in contrast to the representation in FIG. 1) by perpendicular irradiation of the surface. The irradiation space 1 is closed on the entry side by the displaceable door 8 and on the exit side towards the convection space 2 by the displaceable door 9.

Inlets and outlets for drying gases are provided in the convection space 2. In FIG. 1, the inlets are in this case located on the ceiling of the convection space 2. Drying gases (preferably air) which are conveyed into the convection space by a fan 4 enter the convection space 2 through the inlet slits in the ceiling of the latter and thus impinge perpendicularly on the coating sample 7 (lying on the belt). FIG. 2 shows a cross section through the convection space 2 to illustrate the flow routing. Drying gas is forced into the convection space 2 both through the inlet slits 13 in the ceiling of the space and through the side walls and is consequently guided past the sample 7. The drying gases leave the convection space 2 at its lower end and are returned to the convection space again in a circuit 12 via the fan 4. However, the convection space also loses a certain portion of the drying gases through the degassing line 11. This leakage has to be replaced constantly in the circuit 12. This is carried out by supplying fresh drying gases via a heating device 5. In this case, the heating device 5 can be connected, in particular, to a temperature regulating system of the installation, so that the temperature of the drying gases can thus be determined exactly. The output of the fan 4 can likewise be controlled by the regulating system. Typical values for the temperature of the drying gases in the convection space 2 are 30° to 100° C. The velocity of the convection flow is typically 0.2 to 2 m/s in the free cross section of the oven, whilst higher velocities (up to 10 m/s) may occur in the air outlet nozzles. Typical dimensions of the laboratory drier are (length×width×height): 3700×1700×2200 mm.

What is claimed is:

1. A laboratory drier for the simulation of industrial lacquer drying installations, containing a) an irradiation space with infrared emitters, b) a convection space with means for the generation, guidance and movement of drying gases, c) a conveying system for holding and transporting coating samples through the irradiation space and the convection space, d) door systems at the entrance and exit of the laboratory drier as well as between the irradiation space and the convection space, and e) a circuit in which the drying gases are partially conveyed.

2. A laboratory drier according to claim 1, wherein there is a heating device for the drying gases.

3. A laboratory drier according to claim 1, wherein the heating capacity of the IR emitters can be time-controlled.

4. A laboratory drier according to claim 1, wherein the temperature and/or volumetric flow of the drying gases can be time-controlled or regulated by feedback via measuring sensors.

5. A laboratory drier according to claim 1, wherein the conveying system is connected to a control or regulating system for the transport cycle.

6. A laboratory drier according to claim 1, wherein the conveying system is a traveling belt or chain conveyor.

7. A laboratory drier according to claim 1, wherein the radiation space and convection space are connected to a venting system.

8. A laboratory drier according to claim 1, wherein the flow of the drying gases can be variably directed to dry a coating sample rotated through 90°.

9. A laboratory drier according to claim 1, wherein the infrared emitters can be variably arranged to direct radiation to dry a coating sample rotated through 90°.

10. A laboratory drier according to claim 1, wherein the heating capacity of the IR emitters can be regulated by feedback via measuring sensors.

11. A laboratory drier according to claim 1, wherein the heating capacity of the IR emitters can be preselected as constant.

12. A method for simulating industrial lacquer drying installations, comprising the steps of:

a) producing a coating sample;

b) transporting said coating sample using a conveying system to an irradiation space;

c) irradiating said coating sample with infrared radiation;

d) transporting said coating sample to a convection space adjacent to the irradiation space; and e) circulating drying gas around said coating sample wherein the irradiation space and the convection space are separated by a door system and are closed off from each other when the door therebetween is closed.

13. A method according to claim 12, wherein the conveying system is a traveling belt or chain conveyor.

14. A method according to claim 12, wherein the temperature and volumetric flow of the drying gas is regulated.

15. A method according to claim 12, wherein the drying gas is air.

16. A method according to claim 12, further comprising a stationary dwelling period for the coating sample in the irradiation space.

17. A method according to claim 12, further comprising a stationary dwelling period for the coating sample in the convection space.

18. A method according to claim 12, wherein the irradiation is according to a regulated temperature profile.

* * * * *